(12) United States Patent
Schultz et al.

(10) Patent No.: US 9,582,965 B1
(45) Date of Patent: Feb. 28, 2017

(54) INCENTIVIZING USERS TO ALTER VIRTUAL ITEM BALANCES IN AN ONLINE GAME

(71) Applicant: KABAM, INC., San Francisco, CA (US)

(72) Inventors: Stephanie Schultz, San Francisco, CA (US); Luc Pieron, San Francisco, CA (US); Sam McLellan, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 318 days.

(21) Appl. No.: 14/034,685

(22) Filed: Sep. 24, 2013

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *G07F 17/32* | (2006.01) |
| *A63F 13/792* | (2014.01) |

(52) U.S. Cl.
CPC .......... *G07F 17/326* (2013.01); *A63F 13/792* (2014.09); *A63F 2300/535* (2013.01)

(58) Field of Classification Search
CPC . A63F 13/792; A63F 2300/535; G07F 17/326
USPC ..................................... 463/42, 25
See application file for complete search history.

(56) References Cited

U.S. PATENT DOCUMENTS

| | | | |
|---|---|---|---|
| 7,458,892 B2 | 12/2008 | Walker et al. .................. 463/25 |
| 8,221,223 B2 | 7/2012 | Walker et al. .................. 463/25 |
| 8,239,487 B1 | 8/2012 | Hoffman et al. ............. 709/218 |
| 8,287,383 B1 | 10/2012 | Etter | |
| 8,292,743 B1 | 10/2012 | Etter | |
| 8,382,581 B2 | 2/2013 | Fargo ............................. 463/25 |
| 8,443,039 B2 | 5/2013 | Hoffman et al. ............. 709/203 |
| 8,454,442 B2 | 6/2013 | Van Luchene ................. 463/42 |
| 8,469,801 B2 | 6/2013 | Ocko et al. .................... 463/25 |
| 8,510,413 B1 | 8/2013 | Hoffman et al. ............. 709/218 |
| 2002/0072412 A1 | 6/2002 | Young et al. .................. 463/42 |
| 2002/0077169 A1 | 6/2002 | Kelly et al. .................... 463/16 |
| 2006/0178966 A1 | 8/2006 | Jung | |
| 2007/0167210 A1 | 7/2007 | Kelly et al. .................... 463/16 |
| 2007/0243928 A1 | 10/2007 | Iddings ......................... 463/26 |
| 2008/0090659 A1 | 4/2008 | Aguilar | |
| 2009/0029769 A1 | 1/2009 | Muller | |
| 2009/0164287 A1 | 6/2009 | Kies et al. ....................... 705/8 |
| 2009/0247282 A1 | 10/2009 | Cheng ............................ 463/25 |
| 2010/0223115 A1 | 9/2010 | Chodosh et al. .......... 705/14.12 |

(Continued)

*Primary Examiner* — Omkar Deodhar
*Assistant Examiner* — Wei Lee
(74) *Attorney, Agent, or Firm* — Sheppard Mullin Richter & Hampton LLP

(57) ABSTRACT

A system and method for incentivizing users to alter virtual item balances in an online game are disclosed. The incentives may include rewards for users to reach balance goals. The balance goals may specify target balances of virtual items to be reached in user inventories, and a time by which such target balances must be reached in order for the users to receive a reward. Such target balance may include minimum or maximum balances levels, a range of absolute balance levels, a change in the current balance levels of virtual items in the user inventories and/or any other target balances. Determinations whether a given user has reached such target balance in accordance with a balance goal may be made at or before the time specified in the balance goal.

18 Claims, 4 Drawing Sheets

(56) References Cited

U.S. PATENT DOCUMENTS

| | | | |
|---|---|---|---|
| 2011/0264489 A1 | 10/2011 | Ganetakos et al. | 705/12 |
| 2011/0300923 A1* | 12/2011 | Van Luchene | A63F 13/10 463/25 |
| 2011/0302037 A1 | 12/2011 | Sutton-Shearer | 705/14.66 |
| 2012/0122586 A1 | 5/2012 | Kelly et al. | 463/42 |
| 2012/0157212 A1 | 6/2012 | Kane et al. | 463/42 |
| 2012/0178515 A1 | 7/2012 | Adams et al. | 463/17 |
| 2012/0225723 A1 | 9/2012 | Webster et al. | 463/42 |
| 2012/0244950 A1 | 9/2012 | Braun | 463/42 |
| 2012/0259698 A1 | 10/2012 | Yurow | 705/14.51 |
| 2012/0265604 A1 | 10/2012 | Corner et al. | 705/14.39 |
| 2012/0289330 A1 | 11/2012 | Leydon | |
| 2012/0289346 A1 | 11/2012 | Van Luchene | 463/42 |
| 2012/0323683 A1 | 12/2012 | Feldman et al. | 705/14.53 |
| 2012/0329560 A1 | 12/2012 | Kelly et al. | 463/42 |
| 2013/0036064 A1 | 2/2013 | Osvald et al. | 705/319 |
| 2013/0046621 A1 | 2/2013 | Asseoff et al. | 705/14.51 |
| 2013/0072308 A1 | 3/2013 | Peck et al. | 463/42 |
| 2013/0079131 A1 | 3/2013 | Lam | |
| 2013/0079145 A1 | 3/2013 | Lam | |
| 2013/0130781 A1* | 5/2013 | Anderson | G07F 17/3255 463/25 |
| 2013/0138489 A1 | 5/2013 | Fargo | 705/14.12 |
| 2013/0159086 A1 | 6/2013 | Richard | 705/14.33 |
| 2013/0226694 A1 | 8/2013 | Boyd et al. | 705/14.49 |
| 2013/0231999 A1 | 9/2013 | Emrich et al. | 705/14.43 |
| 2013/0252727 A1 | 9/2013 | Ocko et al. | 463/29 |
| 2013/0267308 A1* | 10/2013 | Walker | G06Q 30/02 463/25 |
| 2013/0339111 A1 | 12/2013 | Ross et al. | 705/14.12 |
| 2013/0344968 A1 | 12/2013 | Halfteck et al. | 463/43 |
| 2014/0080590 A1 | 3/2014 | Link et al. | 463/27 |
| 2014/0128153 A1 | 5/2014 | Driemeyer et al. | 463/25 |
| 2014/0164142 A1 | 6/2014 | Yang | 705/14.69 |
| 2014/0194197 A1 | 7/2014 | Graziosi et al. | 463/29 |
| 2014/0248943 A1 | 9/2014 | Burgin et al. | 463/29 |

* cited by examiner

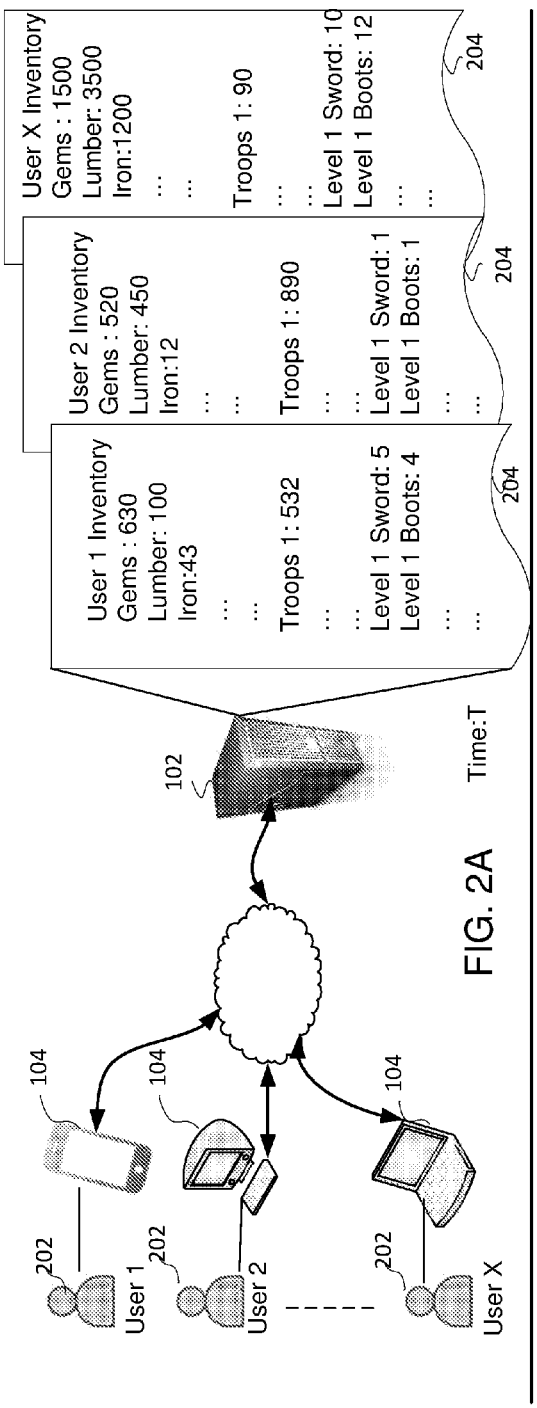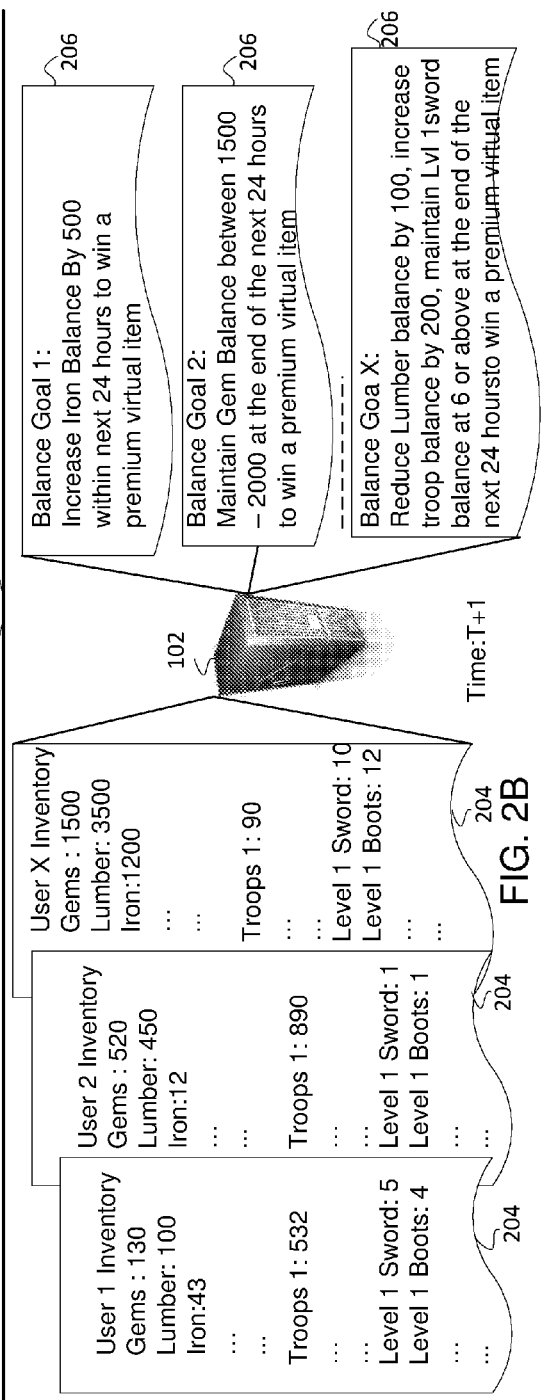

INCENTIVIZING USERS TO ALTER VIRTUAL ITEM BALANCES IN AN ONLINE GAME

FIELD OF THE DISCLOSURE

This disclosure relates to providing incentives in an online game, the incentives being provided to incentivize users to alter virtual item balances in user inventories.

BACKGROUND

Game systems that provide incentives to encourage user progression in games hosted by those systems are known. Typically, the provider of those systems may set up in-game goals to facilitate user progression by incentivizing the users to achieve the in-game goals. For example, a typical in-game goal in the games hosted by those systems is for the users to kill a number of monsters. To incentivize the users to achieve such an in-game goal, the provider typically distributes a reward (e.g., a rare virtual item) to a given user upon the given user achieving the in-game goal.

SUMMARY

One aspect of the disclosure relates to providing incentives in an online game to incentivize users to alter virtual item balances in user inventories through balance goals. The balance goals may be obtained for users to reach target balances of virtual items, which may include virtual currencies, resources, objects, and/or any other game space elements, in the user inventories. In some examples, such target balance may be higher than any current balance level of the virtual items in any user inventory in the game space. For incentivizing a user, the balance goals may specify a time by which the user must reach the target balances in order for the user to receive a reward. This may provide a mechanism to induce the users to acquire the virtual items in accordance with the balance goals. For instance, this may provide a mechanism to induce the users to purchase virtual currencies using real-world money consideration to reach a target balance higher than the current balance of virtual currencies in the user inventories. In some examples, the target balance specified in the balance goal may be lower than any current balance of the virtual items in any user inventory in the game space. This may provide a mechanism to induce the users to consume the virtual items (e.g., virtual currencies), especially after the users have been induced by another balance goal specifying high target balances of the virtual items, for other virtual items. This may enhance monetization opportunities for the provider(s) of the game space as the users may be motivated by the balance goals to transfer real-world money consideration and/or user labor into virtual items. This may enhance user experience in the game space as the users may be incentivized to engage in various gameplays to consume or acquire virtual items to achieve the balance goals.

A system configured for incentivizing users to alter virtual item balances in their inventories may include a server. The server may operate in a client/server architecture with one or more client computing platforms. The client computing platforms may be associated with the users of the game space. The server may be configured to execute one or more of a game module, a user module, an inventory module, a store module, a balance goal module, a balance review module, a reward distribution module, and/or other modules.

The game module may be configured to execute an instance of the game space in which an online game takes place. The users may interact with game space elements and/or with each other through gameplays provided by the online game. The gameplays may include role-playing, first-person shooter, real-time strategy, turn-based strategy, simulation, music and/or rhythm playing, social interaction, twitching and/or any other gameplays. The users may participate in the instance of the game space by inputting commands to initiate user actions for controlling one or more of game space elements. Upon receiving the user commands initiating the user actions, the game module may be configured to execute the user actions. Within the instance of the game space, virtual currencies may be provided to facilitate store and/or exchange of game space values. Units of the provided virtual currencies may reflect game space values. Within the instance of the game space, resources may be, for example, generated, cultivated, mined, harvested, purchased, earned, consumed, traded and/or gifted over time by units, characters, pets, buildings, facilities and/or any other infrastructure or entity in the game space for the user. Resources may be prospected. Resources may be virtual items of value that can be accumulated through participation in the game space.

Inventory module may be configured to manage inventories of virtual items associated with users of the game space executed by the game module. A given user inventory managed by the inventory module may provide an accounting of virtual items, such as virtual currencies, resources, objects, units, and/or any other game space elements that have been procured, controlled by, and/or otherwise associated with a given user in the game space. Such accounting of virtual items may reflect balances of the virtual items associated with the given user. The balances of virtual items in the user inventory may increase, replenish, or exhausted in response to user actions, game space activities participated in by the user, and/or other events associated with the user in which the user may purchase and/or consume virtual items.

Store module may be configured to enable users to spend virtual currencies in exchange for virtual items and/or services usable in the game space. This may involve presenting offers of virtual items and/or services through an interface representing a virtual store in the game space. Such an interface may be implemented on client computing platforms and the users may be enabled to purchase virtual items included in the offers presented through such interface. The virtual store may include a shop run by the provider of the game space, an auction house run by administrator(s) of the game space, a trading place run by users of the game space, and/or any other types of virtual store.

Balance goal module may be configured to obtain balance goals that specify target balances of virtual items for user to reach in user inventories, and a time by which the user must reach such target balance to receive a reward. The target balances specified in the balance goals obtained by the balance goal module may include minimum or maximum levels of balances of virtual items such that the users should maintain the balances of these virtual items in the user inventories under or above the minimum or maximum levels of balances, a range of absolute balance levels of the virtual items such that the users should maintain the balances of these virtual items in the user inventories within such range, a change of balance levels of virtual items in the user inventories, and or any other types of target balances for users to reach in the user inventories. The balance goals obtained by the balance goals module may specify a time by which the user must achieve the target balances of virtual items in the user inventories to receive a reward. In some exemplary implementations, the balance goal module may be configured to obtain the balance goals by dynamically determining the balance goals based on user information such as current balances of virtual items in the user inventories, in-game activities typically engaged in by the users, and/or any other user information. In some examples, the balance goal module may be configured to determine balance goals specifying target balance of a given virtual item higher or lower than any current balance of the given virtual item in any user inventory. In some exemplary implementations, the balance goal module may be configured to obtain balance goals specifically established for one or more users. In those implementations, the balance goal module may be configured with programming rules to obtain balance goals for individual users or selected users.

The balance review module may be configured to review inventories associated with individual users and determine whether the users have reached the target balances in accordance with the balance goals obtained by the balance goal module. This may involve obtaining balance levels of virtual items in the user inventories, determining whether the balance levels of these virtual items have breached the target balances in accordance with the balance goals obtained by the balance goal module and/or any other operations. In some exemplary implementations, the balance review module may be configured to make such reviews and determinations intermittently and dynamically during the period ending at the time specified in the balance goal module. In those implementations, the balance review module may determine that a given user has reached the target balance responsive to a determination that balance level of the virtual item in the user inventory has breached the target balance at any point during that period. In some exemplary implementations, the balance review module may be configured to review user balance level of the virtual item and determine whether the balance level of virtual item has breached the target balance at the time specified in a given balance goal.

The reward distribution module may be configured to distribute rewards to inventories associated with individual users responsive to the balance review module 120 has determined that the users have achieved the balance goals in accordance with the reward criteria specified in the balance goals. This may involve distributing the rewards to the user inventories, notifying the user that such rewards have been distributed to the user inventories, and/or any other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates one example of user inventories associated with users of an online game at a time T.

FIG. 2B illustrates one example of obtaining balance goals for users to alter balances of virtual items in their inventories shown in FIG. 2A at a time T+1.

DETAILED DESCRIPTION

Figure 1:
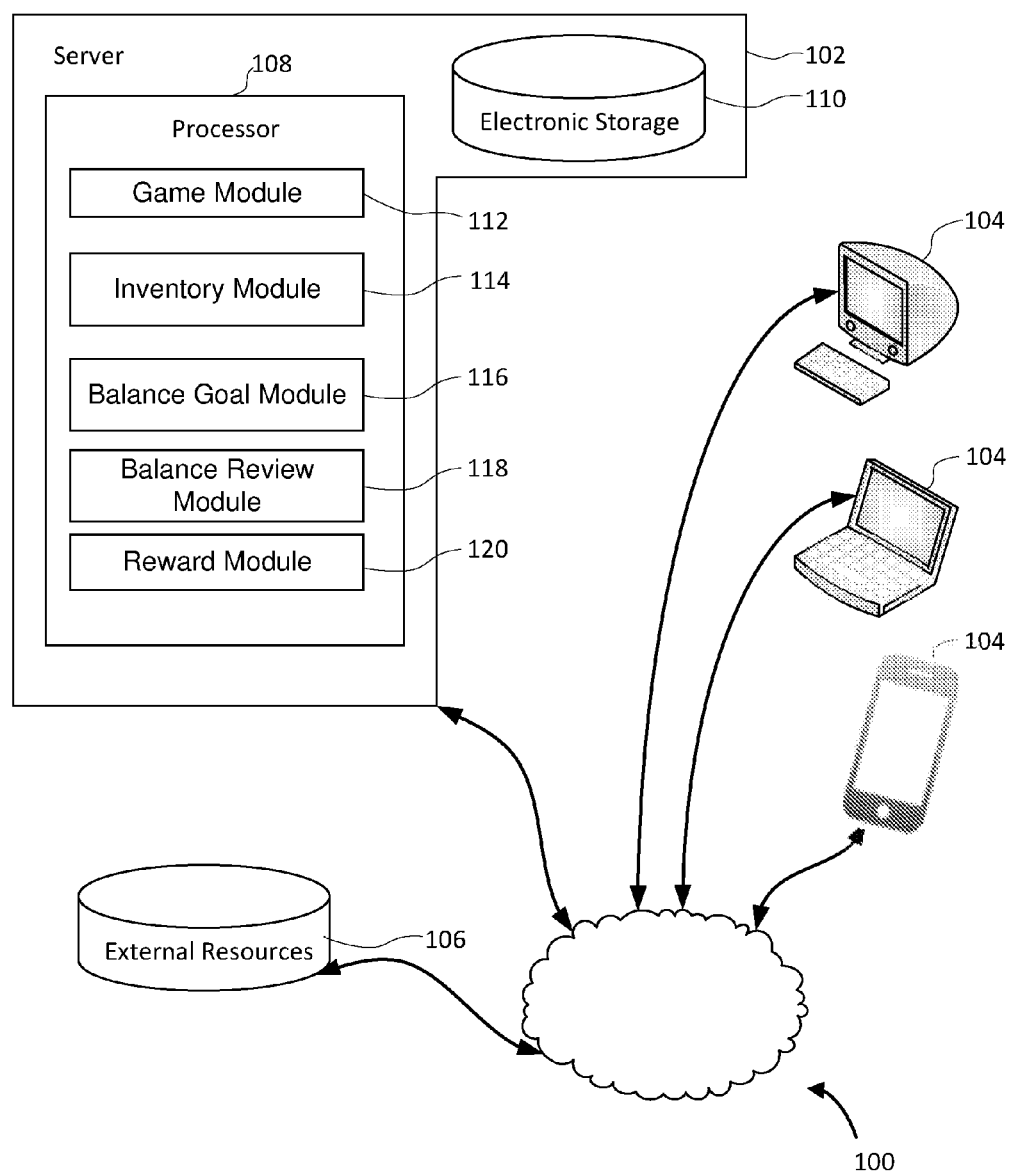
FIG. 1 illustrates one example of a system for incentivizing users to alter balances of virtual items in an online game in accordance with the disclosure.

FIG. 1 illustrates a system 100 for incentivizing users to alter balances of virtual items in an online game. Providing the game space/environment may include hosting the game space/environment over a network. Providing the game space may include hosting the game space over a network. The users may access system 100 and/or the game space via client computing platforms 104.

In some implementations, system 100 may include a server 102. The server 102 may be configured to communicate with one or more client computing platforms 104 according to a client/server architecture. The users may access system 100 and/or the game space via client computing platforms 104. The computer program modules may include one or more of a game module 112, a store module 114, an inventory module 116, a balance goal module 118, a balance review module 120, a reward distribution module 120 and/or other modules.

The game module 112 may be configured to execute an instance of the game space in which an online game takes place. Within the instance of the game space, the users may participate in the game space to experience gameplays provided by the online game. The gameplays may include role-playing, first-person shooter, real-time strategy, turn-based strategy, simulation, music or rhythm playing, social interaction, twitching and/or any other gameplays. For facilitating the user participation in the game space, the game module 112 may be configured to determine states of the game space communicated (e.g., via streaming visual data, via object/position data, and/or other state information) from server 102 to client computing platforms 104 for presentation to users. A given game space state determined and transmitted to a given client computing platform 104 may correspond to a view for a user character being controlled by a user via the given client computing platform 104 at a point of time in the game space. The given state determined and transmitted to a given client computing platform 104 may correspond to a location in the game space. The view described by the given state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the game space may comprise a simulated space that is accessible by users via clients (e.g., client computing platforms 104) that present the views of the game space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the game space may comprise automatically controlled entities not associated with any user. As such, the automatically controlled game space entities may be generated, controlled, evolved, customized, developed and/or otherwise provided by artificial intelligence configured into the server 102 by a provider, administrator, moderator, and/or any other entities related to the game space. The automatically controlled game space entities interact with entities controlled by or associated with the users, other automatically controlled game space entities and as well as the topography of the game space. Certain traits, attributes and/or characteristics may be manifested by, possessed by and/or otherwise associated with the automatically controlled entities and evolved in the game space in accordance with the artificial intelligence. As an illustration, such evolving characteristics of the automatically controlled game space entities may include skills, abilities, powers, strength, stamina, physical appearances such as age, attire, facial expression, speech style and pattern, response style in reaction to user's interaction, gesture and/or any other traits. Examples of the automatically controlled game space entities may include game space characters, objects, components of the topography, game space phenomena (e.g., rains, storms, snow), and/or any other automatically controlled game space elements. As used herein, such automatically controlled game space entities in the instance of the game space are referred to as "AI entities".

The above description of the manner in which state of the game space is determined by game module 112 is not intended to be limiting. The game module 112 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance(s) of the game space executed by game module 112, the users may participate in the instance of the game space by controlling one or more of an element in the game space. The user controlled elements may include user controlled entities such as avatars, characters, units (e.g., troops) and/or any other user controlled entities, controlled objects such as weaponry, vehicle, artillery, medicine, decorative items and/or any other user controlled game space objects, simulated physical phenomena such as wind, rain, earthquakes, and/or other phenomena, and/or other user controlled elements. The user controlled avatars may represent the users in the game space. The user controlled characters (herein referred to as "user characters") may include heroes, knights, commanders, leaders, generals and/or any other individualized characters that may be trained, recruited, captured, and/or otherwise acquired by the users. The game space units controlled by the user may include troops, cohorts, and/or any other game space entities that may be trained, recruited, captured, and/or otherwise acquired by the users in groups or en mass. Unlike user characters, individual members of a game space unit controlled by a given user may not be individualized (e.g., they may share attributes associated with the unit of the troop).

In any case, the user controlled elements may move through and interact with the game space (e.g., AI entities, elements controlled by other users and/or topography in the game space). The elements controlled by a given user may be created and/or customized by the given user. The given user may have an "inventory" of virtual items (e.g., virtual goods and/or currency) that the given user can use (e.g., by manipulation of a user character or other user controlled elements, and/or other items) within the game space.

Controls of virtual elements may be exercised through commands input by the users through client computing platforms 104. The users may interact with each other through communications exchanged within the game space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through game module 112).

A given user may input commands with specific parameters through a client computing platform 104 associated with the given user to initiate user actions or sphere of actions, to under specific deeds, to perform functions and/or initiate any other types of interactions within the game space or with other users. For example, the given user may input commands to construct, upgrade and/or demolish virtual buildings, harvest and/or gather virtual resources, heal virtual user controlled elements, AI entities and/or elements controlled by other users, train, march, transport, reinforce, reassign, recruit, and/or arrange troops, attack, manage, create, demolish and/or defend cities, realms, kingdoms, and/or any other game space locations controlled by or associated with the users, craft or transport virtual items, interact with, compete against or along with AI entities and/or game space elements controlled by other users in combats, research technologies and/or skills, mine and/or prospect for virtual resources, complete missions, quests, and/or campaigns, exercise magic power and/or cast spells, and/or perform any other specific deeds, actions, functions, or sphere of actions within the game space. In some examples, the given user may input commands to compete against elements in an environment within the game space—i.e., PvE activities. In some examples, the given user may input commands to compete against each other within the game space—i.e., PvP activities.

The game module 112 may be configured to execute user actions to facilitate interaction of the users with the game space and/or each other in response to receiving game space commands input by the users. Execution of the user actions by the game module 112 may produce changes to the game space state, which may reflect progresses and/or results of the user actions. In some examples, state changes caused by the execution of the user actions may be recorded in the electronic storage 122 to facilitate persistency throughout the instance of the game space. In some examples, execution of the user actions may not produce persistent changes to the game space state (e.g., a user character jumping forward and backward successively may not produce any perceivable game state changes to other users).

Within the instance of the game space, virtual currencies may be provided to store and/or exchange of game space values. Units of the virtual currencies (for example, a gold, a gem, a silver, a coin, a token, and so on) may reflect game space values as determined by a provider, administrator, moderator, user, and/or any other entities related to the game space. Through one or more units of virtual currencies, game space values may be captured, stored, and circulated in the game space. As one non-limiting example, combinations of user actions, skills, virtual items, time, and/or any other game space elements may be captured, stored and circulated through virtual currencies to reflect the game space values created by user labor in interacting with the game space. For instance, a user may be provided 1000 gems after prospecting and mining for the gems in the game space for a period of time with certain required mining equipment operable only by a skilled game space miner, which the user has expanded labor to become.

Within the instance of the game space, the virtual currencies may be collected, earned, purchased, gifted, or otherwise acquired by the users. For example, the users may purchase the virtual currencies with real-world money consideration (e.g., credit payment through credit card, electronic vouchers provided by the provider of the game space, physical tokens, and so on) through a virtual store. The users may earn the virtual currencies, for example through gameplays provided in the game space (e.g., PvP activities, PvE actives, in game tournament, task, quest, mission, and so on). By way of a non-limiting example, a given user may earn a predetermined amount of virtual currencies after completing an in-game task in the game space. In some examples, the provider of the game space may simply make certain amount of virtual currencies available, for instance through treasure troves in the game space such that the users may gratuitously collect the virtual currencies by exploring for the treasure troves. The users may acquire virtual currencies by receiving gifts that comprise virtual currencies from other users. One of ordinary skills in the art will appreciate that there are other ways to for the users to acquire virtual currencies in the game space.

Within the instance of game space, virtual currencies may be consumed by users to facilitate interactions with the game space. For example, the providers of the game space may require the users to spend virtual currency to fund actions and/or activities engaged in by the users. For instance, the provider may impose a 100 gem fee for a user to participate an event within the game space. In some examples, user may consume virtual currency for purchasing virtual items, for example through the virtual store operated by provider, administrator, moderator, and/or any other entities related to the game space.

Within the instance of the game space executed by game module 112, resources may be, for example, generated, cultivated, mined, harvested, purchased, earned, consumed, traded and/or gifted over time by units, characters, pets, buildings, facilities and/or any other infrastructure or entity in the game space for the user. Resources may be prospected. Resources may be virtual items of value that can be accumulated through participation in the game space, rather than virtual currencies that store values in the game space as described above. As such, resources may be used to satisfy resource requirements in the game space. By way of non-limiting examples, game space resources may include food (e.g., rice, fish, wheat, etc.), wood, minerals (e.g., good, iron, ore, coal, oil, stone, crystal, etc.), plants, animals, and/or any other resources appropriate for the game space. Transfer of resources between users may be reflected through user inventories such that the transferor user's inventory reduces an amount of the transferred resources that are added to the transferee user.

Within the instance of the game space executed by the game module 112, game space goals may be facilitated to motivate users to take actions within the game space. The game space goals may be determined by provider, administrator, moderator, and/or any other entities related to the game space to define game space states which the users should try to achieve through their actions and/or through interactions with other game space entities. Such game space goals may include sub-goals which may be completed to further achievements of the over-arching goals.

The game space goals may be determined by provider, administrator, moderator, and/or any other entities related to the game space a configuration stage of system 100 and/or dynamically during runtime of system 100. However, this is not necessarily the only case. Users may be facilitated to specify goals for other users, for example, to cooperate with the goal specifying users in activities, missions, quests, campaigns in the game space, to assist the objective specifying users, to compete against the objective specifying users, and/or to engage with game space and/or the objective specifying users in any other manners as desired.

Inventory module 114 may be configured to manage inventories of virtual items associated with users of the game space executed by the game module 112. A given user inventory managed by the inventory module 116 may provide an accounting of virtual items, such as virtual currencies, resources, objects, units, and/or any other game space elements that have been procured, controlled by, and/or otherwise associated with a given user in the game space. Such accounting of virtual items may reflect balances of the virtual items with associated the given user, e.g., a quantity of these virtual items, in the user inventory. The virtual items in a given user inventory may include virtual currencies, resources, objects usable in the game space (e.g., weapons, equipment, garments, etc.), units (e.g., troops), and/or any other virtual items. By way of a non-limiting example, the given user may have an X number of virtual currencies, a Y number of a virtual resource (e.g., iron, ore, wood, coal, etc.), a Z number of troops, and so on in the inventory associated with the given user. In that example, the X, Y, and Z may reflect a level of balance of the virtual currencies, the resource, troops associated with the given user respectfully.

Balances of virtual items in the user inventory may increase, replenish, or exhausted in response to user acquiring or consuming the virtual items through a virtual store operated by the provider of the game space, user actions in the game space (e.g., acquiring virtual objects, harvesting resources, consuming resources for crafting, etc.), game space activities participated in by the user, and/or other events associated with the user in which the user may acquire and/or consume virtual items. For example, construction actions initiated by users may consume specific resources in accordance with resource requirements associated with the construction actions, and the user inventory may exhaust the specific resource in the user inventory during execution of the construction. Conversely, users may acquire resources, virtual items, and/or other game space elements in the instance of the game space and the balance of the virtual items in the user inventory may increase accordingly to reflect the user acquisition.

Store module 116 may be configured to enable users to spend virtual currencies in exchange for virtual items and/or services usable in the game space. This may involve presenting offers of virtual items and/or services through an interface representing a virtual in the game space. Such an interface may be implemented on client computing platforms 104 and the users may be enabled to purchase virtual items included in the offers presented through the interface. The virtual store may include a shop run by the provider of the game space wherein virtual items are sold, an auction house run by administrator(s) of the game space, a trading place run by users of the game space, and/or any other types of virtual store. The virtual items purchased by users through the virtual store may be added to the inventories of the users and may be activated by the users to facilitate user participation in the game space.

Balance goal module 116 may be configured to obtain balance goals that specify target balances of virtual items for user to reach in user inventories, and a time by which the user must reach such target balance to receive a reward. The target of balances virtual items specified in the balance goals may include target balances of virtual currencies, resources, virtual objects, and/or any game space elements in the user inventories. Such target balance may include minimum or maximum levels of balances of virtual items such that the users should maintain the balances of these virtual items under or above the minimum or maximum levels of balances (e.g., keep the balance of gems below X number in the inventor or above X number and so on), a range of absolute balance levels of the virtual items such that the users should maintain the balances of these virtual items between such range in the user inventories (e.g., keep the balance of gems between X number and Y number, Y being greater than X), a change of balance levels of virtual items in user inventory (e.g., acquire X number of gems, or consume X number of gems), and or any other types of target balances for users to reach in the user inventories. In some examples, such balance goals may be established by the provider, administrator, moderator, and/or any other entities related to the game space at a configuration stage of the system and stored, for example in electronic storage 122. In those examples, the balance goal module 118 may be configured to obtain the balance goals from the electronic storage 122 during the execution of the game space by the game module 112 at a runtime of system 100. In some other examples, the balance goals may be established by the provider, administrator, moderator, and/or any other entities related to the game space dynamically at the run time, e.g., via a graphical user interface. In those examples, the balance goal module 118 may be configured to communicate with the graphical user interface for obtaining the balance goals during the run time of system 100. In any case, the balance goals obtained by the balance goal module 118 may specify a time by which the user must reach the target balances of virtual items in the user inventories to receive a reward.

In one illustrative example, a balance goal may be obtained from the provider of the game space that specifies a target balance of minimum 3000 gems in the user inventory such that 3000 or more gems should be maintained by the users in the user inventories, and the users must reach this target balance of gems within the next 48 hours of real-world time in order to receive a highly desired premium virtual item. Such a balance goal may encourage the players to acquire virtual currencies (e.g., gems) using real-world money consideration to receive the premium virtual items.

After the 48 hour period passes, another balance goal may be obtained by the balance goal module 118 from the provider of the game space that specifies a target balance of maximum 1000 gems in the user inventory such that 1000 or less gems should maintained by the users in the user inventories, and the user must reach this target balance of gems within a second 48 hour period to receive another highly desired premium virtual item. This may encourage the players to spend the newly acquired gems within the first 48 hour period (e.g., purchased using real-world money consideration) in the virtual store provided by the store module 116. In this way, game space values may be circulated from real-world money consideration by the users to virtual items usable in the game space.

In another example, a balance goal obtained by the balance goal module 118 may specify a target balance of 250 gems increase in the user inventory, and the user must reach this target balance of gems (i.e., to acquire 250 gems and keep them in the user inventory) within the next 12 hour. Still in another example as illustration, a balance goal obtained by the balance goal module 118 may specify a target balance of 200 gem reduction in the user inventory, and the user must reach this target balance of gems (i.e., to consume the 200 gems) by next Monday. It should be understood, the above examples are for illustration only, and thus are not intended to be limiting. It should be appreciated that the type of virtual items that may be specified in the balance goals may not necessarily be limited to virtual currencies (e.g., gems) as in these examples. For instance, in some other examples, the balance goals obtained by the balance goal module 118 may specify target balance levels for virtual resources, units, objects, and/or any other virtual items however desired by the provider, administrator, moderator, and/or any other entities related to the game space to incentivize the users to alter balances of such virtual items in their inventories. It is also understood that a given balance goal obtained by the balance goal module 118 does not necessarily only specify one type of virtual item for which the target balance is to be reached by users. For instance, in some examples, a balance goal obtained by the balance goal module 118 may specify a combination of target balances for different virtual items (e.g., target balance 1 for virtual item 1, target balance 2 for virtual item 2, target balance 3 for virtual item 3 and so on) such that the user should reach all these target balances in accordance with the balance goal.

In some exemplary implementations, the balance goal module 118 may be configured to obtain the balance goals by dynamically determining the balance goals based on user information such as current balances of virtual items in the user inventories, in-game activities typically engaged in by the users, total amount of virtual items in possession by the users in the game space, and/or any other user information. In these implementations, programming rules may be configured into the balance goal module 118 to enable the balance goal module 118 to make such determinations at a run-time of system 100. In one example, the programming rules configured into the balance goal module 118 may include logic enabling the balance goal module 118 to analyze current balances of virtual items in user inventories, and determine whether the users should alter the balances of one or more virtual items in the user inventories. For example, the balance goal module 118 may be configured to analyze user inventories and determine that none of the users has less than 10 gems in their inventories. Based on such a determination, the balance goal module 118 may determine a balance goal for the users to drop the gem balance below 10 gems in the user inventory within the next 24 hours to encourage users to consume the gems. In another example, the balance goal module 118 may analyze user inventories and determine that none of the users has more than 500 gems in their inventories. Base on such a determination, the balance goal module 118 may determine a balance goal for the users to maintain the gem balance above 500 gems in the user inventory within the next 24 hours to encourage users to acquire gems, e.g., by purchasing them using real-world money consideration.

In some exemplary implementations, the balance goal module 118 may be configured to obtain balance goals specifically established for one or more users, e.g. as predetermined by the provider of the game space and/or dynamically determined as described above. In those implementations, the balance goal module 118 may be configured with programming rules to obtain balance goals for individual users or selected users. For example, the balance goal module 118 may be configured to monitor balance levels of a particular virtual item, say a type of virtual resource like iron in the user inventories. In that example, the balance goal module 118 may be configured to obtain a balance goal for a specific user for altering the balance of iron in that user's inventory in response to the balance of iron in that user's inventory has breached a predetermined threshold. For instance, a minimum threshold of iron balance in the user inventory may be predetermined by the provider of the game space and configured into the balance goal module 118 such that any given user is encouraged to keep iron balance level in the user inventory above this minimum threshold. In that instance, the balance goal module 118 may be configured to determine that the iron balance level of a given user has dropped below the minimum threshold, and obtain a balance goal to incentivize the given user to keep the iron balance level above such a minimum threshold.

The balance review module 120 may be configured to review inventories associated with individual users and determine whether the users have reached the target balances in accordance with the balance goals obtained by the balance goal module 118. This may involve obtaining balance levels of virtual items in the user inventories, determining whether the balance levels of these virtual items have breached the target balances in accordance with the balance goals (e.g., whether the user balance has exceeded the target balance or dropped below the target balance), and/or any other operations. The balance review module 120 may be configured to review user inventories for such determinations at or before the time specified in the balance goals. In some exemplary implementations, the balance review module 120 may be configured to make such reviews and determinations intermittently and dynamically during the period ending at the time specified in the balance goals.

By way of a non-limiting example, a given balance goal obtained by the balance goal module 118 may specify a target balance of 3000 gems in the user inventory and the users must reach this target balance of 3000 gems (or above) in the user inventories by next Monday in order for the users to receive a reward. In this example, the balance review module 120 may be configured to review inventories associated with individual users intermittently (e.g., once every 10 minutes when the users are connected with the server 102 through client computing platforms 104, every time the users first log into the server 102 to begin game sessions, logoff to end game sessions, and so on); and determine whether the individual users have reached the target balance (e.g., 3000 gems in their inventories) at a point of time at or before the end of next Monday. Responsive to a determination that a user has reached 3000 gem balance in the game space (e.g., the user balance level of gems in the inventory has breached 3000 gems), the balance review module 120 may be configured to communicate with, for example the reward distribution module 120 to report such a determination. For instance, at any point ending at next Monday, the balance review module 120 in these examples may determine that the user has reached the target balance of 3000 gems in in accordance with the balance goal, even though the user balance level of gems may drop below the 3000 gem level after reaching it subsequently.

In some exemplary implementations, the balance review module 120 may be configured to review user balance level of the virtual items at the time specified in the balance goal. For instance, still in the example wherein the balance goal obtained by the balance goal module 118 specifies a target balance of 3000 gems to be reached by users by next Monday user to receive a reward, the balance review module 120 may be configured to review the balance of gems in user inventories associated with the individual users at the end of next Monday. That is, in these implementations, the balance review module 120 may be configured to review balances of the virtual items in user inventories only at the time specified in the balance goal and determine whether a given user has reached the target balance at that time. In these implementations, in order for a user to receive a reward, the user must maintain the target balance (e.g., the 3000 or more gems) at the time (e.g., next Monday) specified in the balance goal. Accordingly, in these implementations, a user will not be determined by the balance review module 120 to have reached the target balance in accordance with the balance goal even if the user balance of gems has reached the 3000 gem level before next Monday, but dropped below the 3000 level subsequently and does not reach the 3000 gem level again at the end of next Monday.

The reward distribution module 120 may be configured to distribute rewards to inventories associated with individual users responsive to the balance review module 120 has determined that the users have achieved the balance goals in accordance with the reward criteria specified in the balance goals. This may involve distributing the rewards to the user inventories, notifying the user that such rewards have been distributed to the user inventories, and/or any other operations.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 112, 114, 116, 118, 120, 122. Processor 108 may be configured to execute modules 112, 114, 116, 118, 120, 122 by software; hardware; firmware; some combination of software, hardware, and/or firmware; and/or other mechanisms for configuring processing capabilities on processor 108.

It should be appreciated that although modules 112, 114, 116, 118, 120, 122 are illustrated in FIG. 1 as being co-located within a single processing unit, in implementations in which processor 108 includes multiple processing units, one or more of modules 112, 114, 116, 118, 120, 122 may be located remotely from the other modules. The description of the functionality provided by the different modules 112, 114, 116, 118, 120, 122 described below is for illustrative purposes, and is not intended to be limiting, as any of modules 112, 114, 116, 118, 120, 122 may provide more or less functionality than is described. For example, one or more of modules 112, 114, 116, 118, 120, 122 may be eliminated, and some or all of its functionality may be provided by other ones of modules 112, 114, 116, 118, 120, 122. As another example, processor 108 may be configured to execute one or more additional modules that may perform some or all of the functionality attributed below to one of modules 112, 114, 116, 118, 120, 122.

Figure 2C:
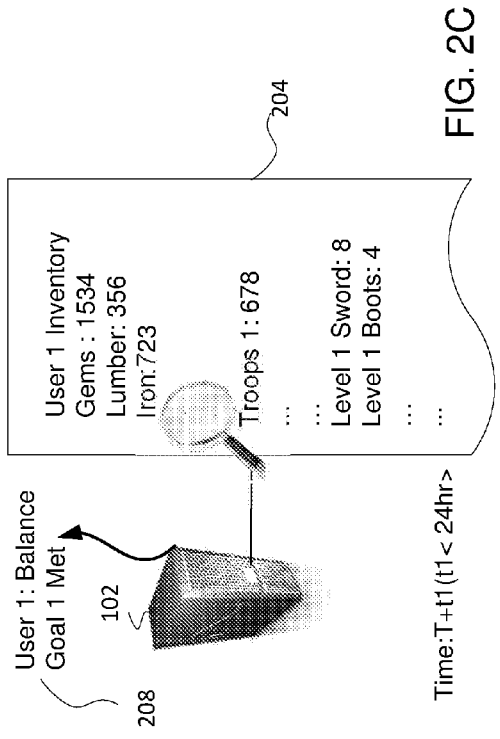
FIG. 2C illustrates one example of reviewing the balance of virtual item in a user inventory at time T+t in accordance with the disclosure.

FIGS. 2A-D illustrates one example of using system 100 shown in FIG. 1 for incentivizing users to alter the balances of virtual items in their inventories in accordance with the disclosure. They will be described with references to FIG. 1. FIG. 2A illustrates one example of user inventories associated with users of an online game at a time T. As shown in this example, the users 202 of online game may access the server 102 shown in FIG. 1 through client computing platforms 104. As illustrated, the users 202 may be associated with inventories 204, which provides an accounting of virtual items that were procured, harvested, purchased, amassed, or otherwise acquired by the users 202 in the game space of the online game.

FIG. 2B illustrates one example of obtaining balance goals for users to alter balances of virtual items in their inventories shown in FIG. 2A at a time T+1. As shown, at time T+1, balance goals 206 may be obtained by the server 102 (e.g., via a balance goal module as described above). As illustrated, the obtained balance goals 204 may specify target balances of virtual items for users 202 to reach and reward criteria as described above. In this example, three balance goals are illustrated. It is understood, the number of balance goals 206 may vary in some other examples.

FIG. 2C illustrates one example of reviewing the balance of virtual item in a user inventory at time T+t in accordance with the disclosure. As shown in this example, time T+t is a point of time between time T and T+24 hrs. In this example, user 1 inventory 204 is shown. As illustrated, at time T+t, the balance of iron has increased by 500 as compared to that at time T shown in FIG. 2B. Accordingly, as shown, the server 202 makes a determination 208 that user 1 has reached the balance goal #1 and a reward may be distributed to the user 1 (e.g., via a reward distribution module described above). It should be noticed that at time T+t, the gem balance of user 1 has breached the target balance (i.e., 1500-2000) gems specified in balance goal #2. However, since balance goal #2 specifies that the user should maintain the target balance of gems at the end of T+24 hrs, and at time T+t, such time has not matured, a determination is not made in terms of balance goal #2 for user 1 at time T+t.

Figure 2D:
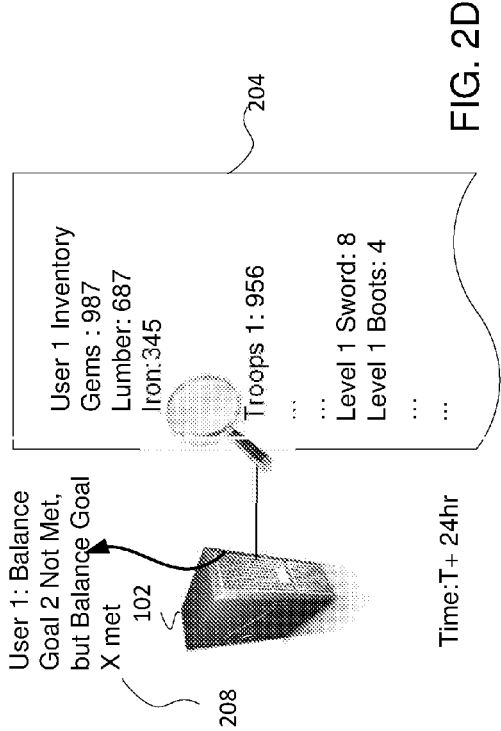
FIG. 2D illustrates one example of reviewing the balance of virtual item in a user inventory at time T+24 hrs in accordance with the disclosure.

FIG. 2D illustrates one example of reviewing the balance of virtual item in a user inventory at time T+24 hrs in accordance with the disclosure. As shown in this example, at time T+24 hrs, the server 102 reviews virtual item balances in user1 202 inventory and makes a determination 208 that user 1 has reached the target balances specified in the balance goal #3 as compared to those at time t+1. However, as also shown in this example, since user1 does not maintain a balance of gems as specified in the balance goal #2 (i.e., between 1500 and 2000 gems in the user inventory), server 102 makes a determination 208 that the user has not reached balance goal #2 at time T+24 hrs. This illustrates, although user 1 has breached the target balance of gems between time T and T+24 specified in balance goal #2, a reward may not be distributed to user 1 because such a balance level is maintained at the end of T+24 hrs by user 1.

Figure 3:
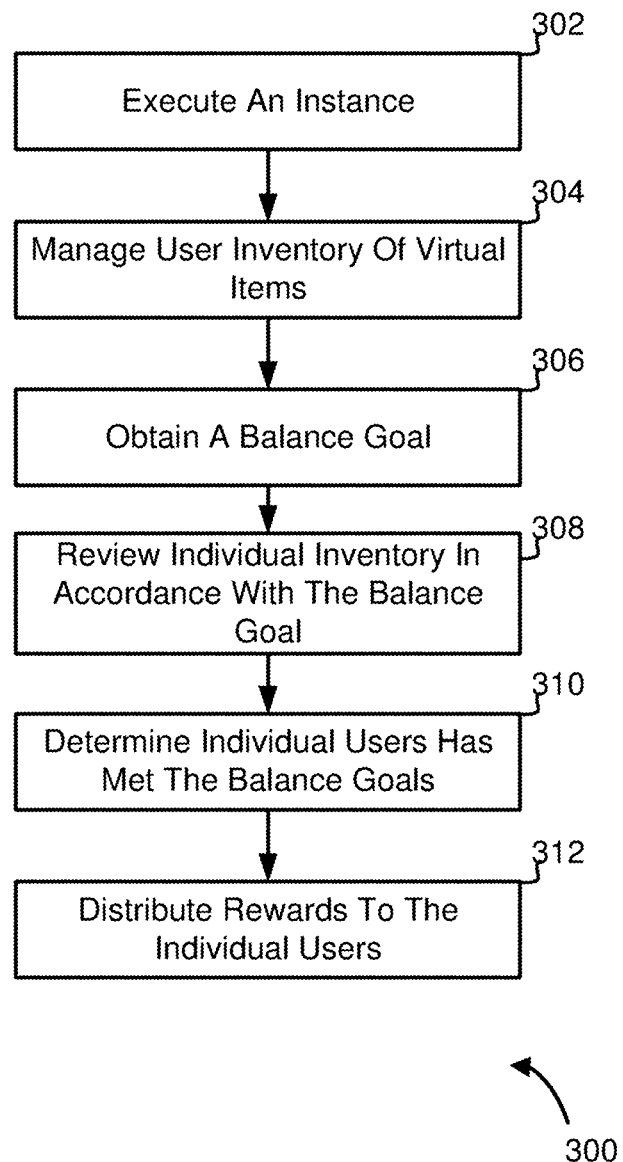
FIG. 3 illustrates one exemplary method for incentivizing users to alter balances of virtual items in an online game in accordance with the disclosure.

FIG. 3 illustrates one exemplary method 300 for incentivizing users to alter balances of virtual items in an online game in accordance with the disclosure. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a game space may be executed and implemented to determine view information for transmission to one or more client computing platforms associated with users. The users may interact with the game space by initiating game space commands to perform user actions. The user actions may be executed in the game space. In some implementations, operation 302 may be performed by a game module the same as or similar to game module 112 (shown in FIG. 1 and described herein).

At an operation 304, user inventories associated with the users may be managed. The user inventory may include a first user inventory associated with a first user. In some implementations, operation 304 may be performed by a user inventory module the same as or similar to user inventory module 116 (shown in FIG. 1 and described herein).

At an operation 306, a balance goal may be obtained. The balance goal obtained in the operation 306 may specify a target balance of virtual items for users to reach in their inventories and reward criteria. The reward criteria may specify a time by which the target balance should be reached by the users to receive a reward. In some implementations, operation 306 may be performed by a balance goal module the same as or similar to balance goal module 118 (shown in FIG. 1 and described herein).

At operation 308, balances of virtual items in the user inventories associated with individual users may be reviewed in accordance with the balance goal obtained in operation 306. In some implementations, operation 308 may be performed by a balance review module the same as or similar to user balance review module 120 (shown in FIG. 1 and described herein).

At an operation 310, determinations that individual users have met the balance goal in accordance with the reward criteria specified in the balance goal may be made. In some implementations, operation 310 may be performed by a balance review module the same as or similar to balance review module 120 (shown in FIG. 1 and described herein).

At an operation 312, rewards may be distributed to those users determined as having reached the balance goal in operation 310. In some implementations, operation 312 may be performed by a reward distribution module the same as or similar to Reward Module 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for incentivizing users to alter virtual item balances in user inventories in a game space, the system comprising:
one or more processors configured by machine-readable instructions to:
execute a game instance of a game space, and to implement the game instance of the game space to effectuate transmission of information over a network to client computing platforms associated with users that causes the client computing platforms associated with the users to present views of the game space to the users, and to enable interaction of the users with the game space and/or each other by performing operations in the game space in response to commands received over the network from the client computing platforms associated with the users;
manage user inventories of virtual items associated with individual ones of the users and the game space, the user inventories indicating balances of a first virtual item usable in the game space associated with the individual ones of the users such that a first user inventory indicates a balance of a first virtual item associated with a first user;
enable users to spend virtual currencies within the game space in exchange for virtual items usable in the game space;
obtain current balances of the virtual items indicated by the user inventories, the current balances including first current balances of the first virtual item indicated by the user inventories associated with the individual ones of the users;
dynamically determine, based on the current balances of the virtual items obtained, balance goals for users to reach target balances of the virtual items in the user inventories associated with the game space, the balance goals including a first balance goal specifying a target balance of the first virtual item to be reached in the first user inventory determined based on the first current balances of the first virtual item indicated by the user inventories associated with the individual ones of the users, the first balance goal further specifying a time by which such target balance must be reached in order for the first user to receive a reward;
review the balance of the first virtual item in the first user inventory and determine whether the first user has reached the target balance of the first virtual item in accordance with the first balance goal determined; and
distribute a reward to the first user inventory associated with the first user and the game space responsive to a determination that the first user has reached the target balance of the first virtual item in the first user inventory in accordance with the first balance goal wherein the reward is distributed to the first user irrespective of a purchase or achievement within the game by the first user and distribution of the reward causes the first user inventory to update to include the reward without depleting the first user inventory.

2. The system of claim 1, wherein determining the first user has reached the target balance of the first virtual item in accordance with the first balance goal comprises:
   obtaining the balance of the first virtual item in the first user inventory at the time specified by the first balance goal; and
   determining that the obtained balance of the first virtual item in the first user inventory has reached the target balance specified by the first balance goal.

3. The system of claim 1, wherein determining the first user has reached the target balance of the first virtual item in accordance with the first balance goal comprises:
   obtaining the balance of the first virtual item in the first user inventory intermittently during a period ending at the time specified by the first balance goal; and
   determining that a given balance of the first virtual item in the first user inventory obtained during the period has reached the target balance specified by the first balance goal.

4. The system of claim 1, wherein the target balance of the first virtual item specified by the first balance goal includes an amount of change in the balance of the first virtual time to be reached in the user inventories.

5. The system of claim 1, wherein the target balance specified by the first balance goal include a range of absolute balances of the first virtual item to be reached in the user inventories.

6. The system of claim 1, wherein the target balance specified by the first balance goal is higher than any of the first current balances of the first virtual item in the user inventories associated with the game space.

7. The system of claim 1, wherein the target balance specified by the first balance goal is lower than any of the first current balances of the first virtual item in the user inventories associated with the game space.

8. The system of claim 1, wherein the first virtual item includes virtual currency, virtual resource and/or virtual objects.

9. The system of claim 1, wherein the first balance goal is obtained for the first user only.

10. A method for incentivizing users to alter virtual item balances in user inventories in a game space, the method being implemented in one or more physical processors configured by machine-readable instructions, the method comprising:
   executing a game instance of a game space, and implementing the game instance of the game space to effectuate transmission of information over a network to client computing platforms associated with users that causes the client computing platforms associated with the users to present views of the game space to the users, and to enable interaction of the users with the game space and/or each other by performing operations in the game space in response to commands received over the network from the client computing platforms associated with the users;
   managing user inventories of virtual items associated with individual ones of the users and the game space, the user inventories indicating balances of a first virtual item usable in the game space associated with the individual ones of the users such that a first user inventory indicates a balance of a first virtual item associated with a first user;
   obtaining current balances of the virtual items indicated by the user inventories, the current balances including first current balances of the first virtual item indicated by the user inventories associated with the individual ones of the users;
   dynamically determining, based on the current balances of the virtual items obtained, balance goals for users to reach target balances of the virtual items in the user inventories associated with the game space, the balance goals including a first balance goal specifying a target balance of the first virtual item to be reached in the first user inventory determined based on the first current balances of the first virtual item indicated by the user inventories associated with the individual ones of the users, the first balance goal further specifying a time by which such target balance must be reached in order for the first user to receive a reward;
   reviewing the balance of the first virtual item in the first user inventory and determine whether the first user has reached the target balance of the first virtual item in accordance with the first balance goals determined; and
   distributing a reward to the first user inventory associated with the first user and the game space responsive to determining that the first user has reached the target balance of the first virtual item in the first user inventory in accordance with the first balance goal wherein the reward is distributed to the first user irrespective of a purchase or achievement within the game by the first user and distribution of the reward causes the first user inventory to update to include the reward without depleting the first user inventory.

11. The method of claim 10, wherein determining the first user has reached the target balance of the first virtual item in accordance with the first balance goal comprises:
   obtaining the balance of the first virtual item in the first user inventory at the time specified by the first balance goal; and
   determining that the obtained balance of the first virtual item in the first user inventory has reached the target balance specified by the first balance goal.

12. The method of claim 10, wherein determining the first user has reached the target balance of the first virtual item in accordance with the first balance goal comprises:
   obtaining the balance of the first virtual item in the first user inventory intermittently during a period ending at the time specified by the first balance goal; and
   determining that a given balance of the first virtual item in the first user inventory obtained during the period has reached the target balance specified by the first balance goal.

13. The method of claim 10, wherein the target balance of the first virtual item specified by the first balance goal includes an amount of change in the balance of the first virtual time to be reached in the user inventories.

14. The method of claim 10, wherein the target balance specified by the first balance goal include a range of absolute balances of the first virtual item to be reached in the user inventories.

15. The method of claim 10, wherein the target balance specified by the first balance goal is higher than the first current balances of the first virtual item in the user inventories associated with the game space.

16. The method of claim 10, wherein the target balance specified by the first balance goal is lower than the first current balances of the first virtual item in the user inventories associated with the game space.

17. The method of claim 10, wherein the first virtual item includes virtual currency, virtual resource and/or virtual objects.

18. The method of claim 10, wherein the first balance goal is obtained for the first user only.

* * * * *

UNITED STATES PATENT AND TRADEMARK OFFICE
CERTIFICATE OF CORRECTION

PATENT NO. : 9,582,965 B1  Page 1 of 1
APPLICATION NO. : 14/034685
DATED : February 28, 2017
INVENTOR(S) : Stephanie Schultz et al.

It is certified that error appears in the above-identified patent and that said Letters Patent is hereby corrected as shown below:

In the Claims

Claim 10, Line 44, (Column 18, Line 19), please change "goals" to --goal--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*